United States Patent

[11] 3,558,950

[72] Inventor George M. Raybould
Cleveland Heights, Ohio
[21] Appl. No. 744,167
[22] Filed July 11, 1968
[45] Patented Jan. 26, 1971
[73] Assignee Reliance Electric and Engineering
Company
a corporation of Ohio

[54] COIL END SUPPORT
5 Claims, 7 Drawing Figs.
[52] U.S. Cl.................................................. 310/270,
310/271
[51] Int. Cl...................................................... H02k 3/46
[50] Field of Search............................................ 310/270,
271, 260, 235, 236

[56] References Cited
UNITED STATES PATENTS
2,482,527 9/1949 Weil.............................. 310/270
2,896,100 7/1959 Axelson......................... 310/271X
2,528,235 10/1950 Lonitsch........................ 310/236X
3,151,260 9/1964 MacCracken et al.......... 310/270X
3,014,146 12/1961 Andres.......................... 310/270
FOREIGN PATENTS
1,039,615 9/1958 Germany....................... 310/270

Primary Examiner—Milton D. Hirshfield
Assistant Examiner—B. A. Reynolds
Attorney—Woodling, Krost, Granger & Rust ABSTRACT: The disclosure relates to a dynamoelectric machine having a winding on a rotor with the coil end turns of the winding supported and secured to a ring of insulation material. The ring is made from resin impregnated tape or roving and has a cylindrical collar and two stiffening flanges disposed in a U-shape in radial cross section. The coil end turns are secured to this ring by banding tape on the outer periphery of the coil end turns and this constitutes the only support of the ring so that the ring is free floating and can move axially with changing temperatures of the coil end turns and also this free floating support permits a maximum air passage between the ring and the machine shaft for maximum cooling.

INVENTOR.
GEORGE M. RAYBOULD
BY Woodling, Krost,
Granger and Rust
ATTORNEYS.

INVENTOR.
GEORGE M. RAYBOULD
BY Woodling, Krost,
Granger and Rust
ATTORNEYS.

COIL END SUPPORT

BACKGROUND OF THE INVENTION

In dynamoelectric machines such as motors and generators wherein the rotor has a winding including coils which extend generally axially from slots in the rotor and then make a turn to pass through another slot, these coil end turns need supporting against movement, especially in the integral horsepower sizes of such machines. Many such machines are commutator type and this is designated as front end of the machine, the opposite end being a rear end having just a coil end turn which exposes the axial end of the rotor core. At the front end the rotor windings, usually designated armature windings, extend axially and sometimes also radially inwardly to a commutator riser and thus the front axial end of the rotor core is generally concealed from view. The present invention may be used on either the front or rear end of such a motor although it has particular advantages with the rear end.

The reason why the coil end turns need supporting is because these coils are subjected to considerable forces and stress during operation of the motor. Usually the greatest force is centrifugal force and usually the next greatest is the inertia forces during fast reversing or stopping of the motor. Additionally thermal stresses are present because of the axial expansion of the coils during operation. Another cause of the stress is the changing current in the coils causing changing fields and these fields are at various angles to each other because the conductors are at various angles. This produces forces on the conductors which are rapidly changing and this tends to move one portion of the coil end relative to another portion.

The prior art has used several solutions to support the coil end turns and currently a popular means of doing this is by coil shelves which have a flange surface bolted to the end of the rotor core and a collar surface at right angles thereto extending outwardly in an axial direction underneath the coil end turns. Banding, such as metal wires are then used to pull the coil end turns down tight against the shelf supports. These coil shelves have the disadvantage of requiring insulation at least on the outer surface inasmuch as they are made of metal such as cast iron. They also have the disadvantage of rather heavy weight which increases the inertia of the machine. Still further these coil shelves reduce the amount of air ventilation which may be passed through the core because the coil shelf flanges block some of the air passages. Also the coil shelf collar portion extends almost the full extent of the inner periphery of the coil ends and thus air cannot pass in a radial direction between the coils closely adjacent the rotor core end face. Also the metal coil shelf does not have the same thermal expansion as the coils and does not permit the coil ends to readily expand axially with increasing temperatures.

SUMMARY OF THE INVENTION

The invention may be incorporated in the method of supporting the coil end turns of a winding of a dynamoelectric machine having a rotor core and shaft, comprising the steps of, making a circular ring having an insulated outer peripheral face and a stiffening flange means having a wall extending generally radially inwardly, mounting the ring on a removable fixture on one of the core and shaft, placing the winding on the rotor core with the coil end turns lying radially outside but in contact with the outer peripheral face of said ring, securing the coil end turns inwardly in a radial direction against the outer peripheral face of said ring, removing the removable fixture, balancing the rotor core to determine the desired location on the ring requiring a balance weight, and securing a weight on said ring in the desired location in contact with said wall of said stiffening flange means.

An object of the invention is to provide a coil end turn support which may also be used for balancing a dynamoelectric machine rotor.

Another object of the invention is to provide a method of making a circular ring and the method of using this ring in supporting coil end turns of a dynamoelectric machine.

Another object of the invention is to provide a coil end turn support and balancing ring assembly wherein a ring is used having an insulated outer face engaging the coil end turns and the ring has a U-shaped cross section to receive a balancing weight.

Other objects and a fuller understanding of the invention may be had by referring to the following description and claims, taken in conjunction with the accompanying drawings.

DESCRIPTION OF THE PREFERRED EMBODIMENT

Figure 1:
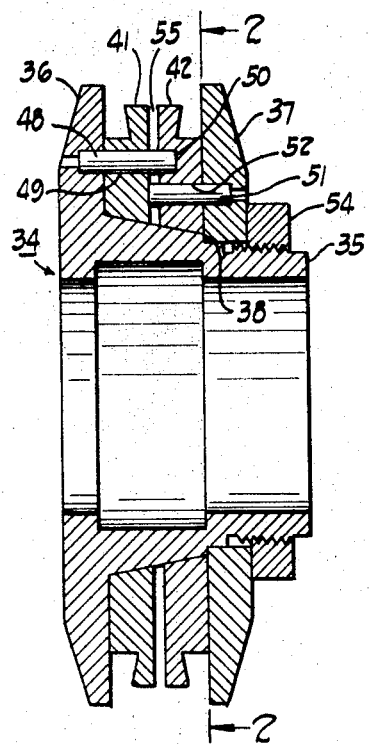
FIG. 1 is a side view partially in section of tooling to produce a support and balancing ring.

The FIGS. of the drawing illustrate the preferred method and assembly of supporting the coil end turns of a winding of a dynamoelectric machine. However, such preferred embodiment is not to be taken as limiting, the invention being defined only by the hereinafter appended claims.

Figure 4:
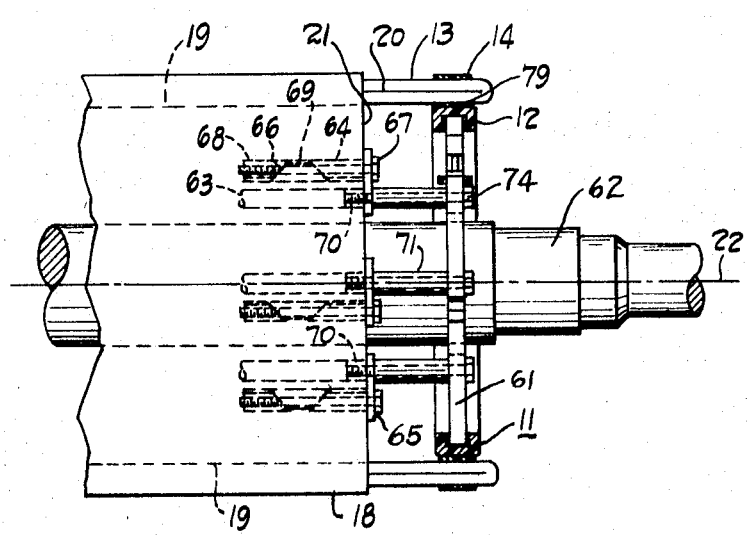
FIG. 4 is a partial side view of a dynamoelectric machine rotor with a removable fixture holding the ring in place.
Figure 5:
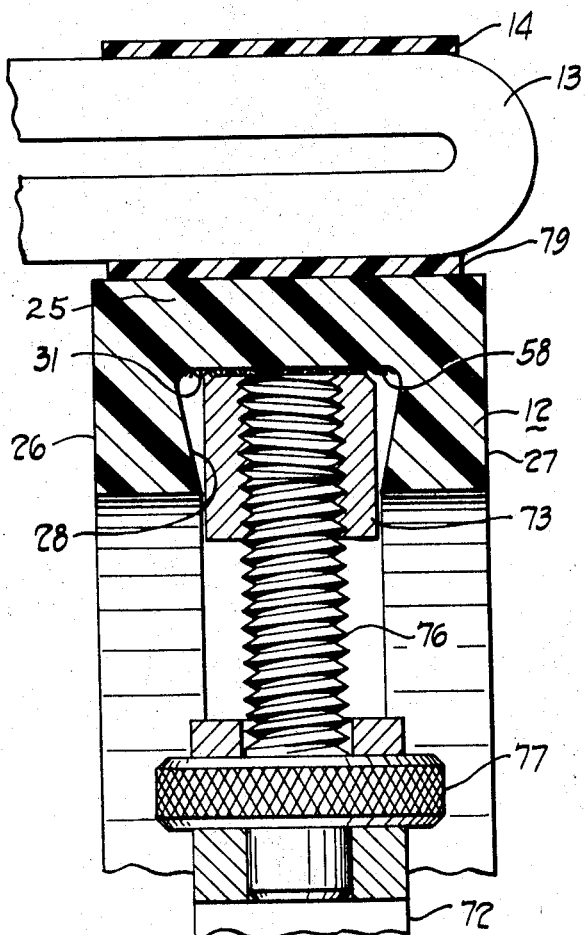
FIG. 5 is an enlarged partial view similar to FIG. 4.
Figure 7:
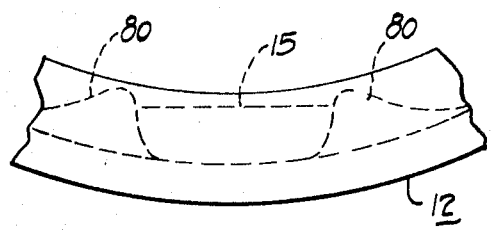
FIG. 7 is a partial end view of the support ring 12 having a balance weight therein.

The invention includes a support and balancing ring assembly 11 shown generally in FIGS. 4 and 5. This assembly 11 includes generally a circular ring 12, coil end turns 13, securing means 14 securing the coil end turns 13 to the ring 12 and a balance weight 15. This support and balance ring assembly 11 is used with a dynamoelectric machine of which only the rotor 18 is shown. This rotor may have slots 19 to receive a winding comprising a group of coils 20. In the usual dynamoelectric machine which has a commutator, the rotor has a front end containing the commutator, not shown, and has a rear face 21. The coils 20 extend out of a slot, extending at an angle to the axis 22, make a turn at the coil end turn 13 and extend at another angle to reach a different one of the slots 19. Usually the coil end turns 13 change the radial dimension from the axis 22 at the time of making the turn so that one portion of the coil 20 lies in the bottom of a slot and another portion lies in the top of a different slot. In the front end of the rotor core, not shown, these coils 20 usually have a coil end turn to extend axially and sometimes also radially inwardly to connect to a riser of a commutator bar. The circular ring 12 may be used at either the front or rear end of the rotor and is shown in use at the rear end. At the front end of the rotor the coils 20 may not make a radially inward turn, instead they may extend directly to the commutator bar riser but this extension of the coil may be considered a coil end turn insofar as use with this invention is concerned.

Figure 3:
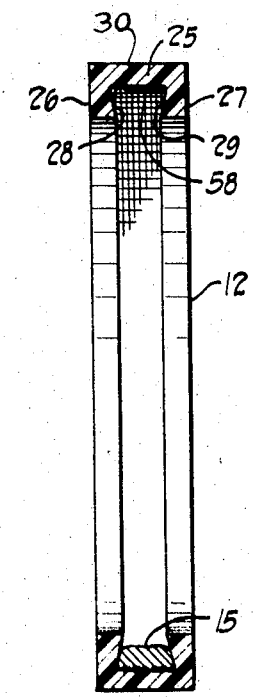
FIG. 3 is a side view partially in section of a support and balancing ring made on the tooling of FIGS. 1 and 2.

The circular ring 12 in its preferred form is shown in FIG. 3. This ring is made with a collar 25 which is substantially cylindrical and with flange means including first and second flanges 26 and 27, respectively. The flanges 26 and 27 have generally radially inwardly directed walls to form a U-shape in radial cross section of the ring 12. The flange 26 has an inwardly facing wall 28 and the flange 27 has an inwardly facing wall 29. The collar 25 has an outer peripheral face 30 and an inner peripheral face 31. At least the outer peripheral face 30 is made of insulating material and in this preferred embodiment substantially the entire ring 12 is made from insulating material. The inwardly facing walls 28 and 29 of the flanges 26 and 27 converge in a radially inwardly direction to retain the weight 15 in place.

Figure 2:
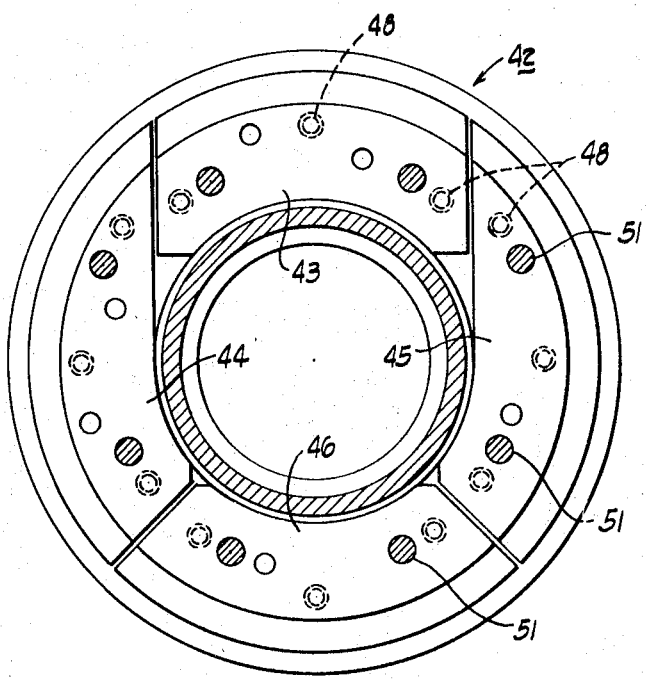
FIG. 2 is a sectional view on the line 2—2 of FIG. 1.

FIGS. 1 and 2 show tooling 34 to make the circular ring 12. A hub 35 has a unitary flange 36, a second flange 37 is received on a portion 38 of the hub 35. First and second core assemblies 41 and 42, respectively, are similar in construction and each includes four sections. FIG. 2 shows the first through fourth sections 43, 44, 45, and 46 of the second core assembly 42. A first plurality of dowels 48 is fitted in the flange 36 and extended through clearance holes 49 in the first core assembly 41 and are received in abutment holes 50 in the second core assembly 42. A second plurality of dowels 51 is fitted in the flange 37, pass through clearance holes 52 in the second core assembly 42 and abut the first core assembly 41. FIG. 2 reveals that the first through fourth sections 43—46 of the second core assembly 42 form a circular ring when assembled as shown in FIG. 2 and these are held in place by the dowels 48 and 51. An inspection of FIG. 1 will show that when the tooling 34 is assembled as shown therein, then a lock nut 54 may be threaded onto the hub 35 to maintain a definite spacing 55 between the first and second core assemblies 41 and 42. This is because the lock nut 54 bears against the flange 37 and the force is transmitted into two paths, one through the core assembly 42, and dowels 48 to the flange 36 and the other through the dowels 51 and core assembly 41 to the flange 36. In this condition of the tooling 34, a strip of metal wire screen 58 may be wound around the two core assemblies 41 and 42 to bridge the gap 55. Next the tooling 34 may be supported on an arbor and rotated as resin impregnated tape or roving is wound between the flanges 36 and 37. This may be glass fiber tape or roving with any of the usual forms of resin which may be cured by heat, for example, to set to a hard state. The resin impregnated tape or roving is wound to about the outer periphery of the flanges 36 and 37 and then the entire unit is baked to cure the resin and form a hard ring 12 as shown in FIG. 3.

The ring 12 may be removed from the tooling 34 by removing the lock nut 54. The flanges 36 and 37 may then be removed from opposite axial ends and this, of course, removes the hub 35 and also removes the dowels 48 and 51. The first core assembly 41 has sections of similar shape to the sections 43—46 of the core assembly 42. Accordingly the first sections 43 may be moved radially inwardly, next sections 44 and 45 may be moved generally radially inwardly and last the sections 46 may be moved inwardly for removal from the inside of the ring 12. Thus the tooling 34 provides an easily assembled and disassembled tooling for forming the ring 12 and support during baking. This tooling 34 is easily collapsed and expanded in both an axial direction and a radial direction so that the ring 12 may be formed not only with radially inwardly extending flanges 26 and 27 but also one wherein the walls 28 and 29 converge in a radially inward direction.

Figure 6:
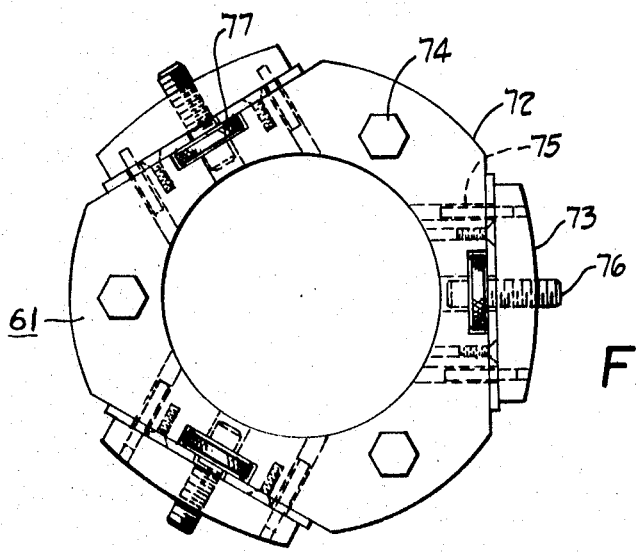
FIG. 6 is an enlarged partial view showing the removable fixture.

FIG. 4 generally shows the support and balance ring assembly 11 on the rotor core 18. A removable fixture 61 is used to mount the circular ring 12 on one of the rotor core 18 and shaft 62. In this preferred embodiment it is removably secured to the rotor core 18. The rotor core 18 has a plurality of axially directed holes 63 such as ventilation passageways. A plurality of three part expandible mandrels 64 extend through plates 65 into several of the ventilation passageways 63. Each three-part mandrel has sloping faces 66 so that upon tightening of a bolt 67 into the nut 68 the sloping faces coact to force the middle section 69 transversely to bind the mandrels 64 inside the ventilating passageway 63. This fastens each plate 65 to the rotor core 18. Each plate 65 has a pin 70 in another ventilation hole to prevent twisting of the plate 65. The pin 70 is a threaded nut to receive one of several bolts 74 extending through spacers 71 from a metal annulus 72. The spacers 71 space the annulus 72 from the rotor end face 21 and the bolts 74 rigidly hold this annulus 72. Fingers 73, in this case three in number, are carried on the annulus 72, as better shown in FIGS. 5 and 6. These fingers may slide radially as guided by guide pins 75 and as moved by screws 76 each having a thumb wheel head 77. By turning the thumb wheel head 77, the fingers 73 may be moved radially outward and inward. When moved outwardly to the position shown in FIG. 5, these fingers will engage the groove established by the U-shape of the circular ring 12. The thumb wheel head 77 may be turned in the opposite direction to retract the fingers 73 for dismounting of the removable fixture 61 from the complete assembly 11. This removable fixture 61 provides a quickly mounted and rigid support for the ring 12 which may easily be made concentric with the axis 22 and which will not be displaced from this concentricity.

With the removable fixture 61 and circular ring 12 in place, the coils 20 may be wound to form the winding on the rotor 18. In most cases for the large sizes of dynamoelectric machines these are preformed coils which are hammered or forced into the slots 19. Before the coils 20 are placed in position, a few turns of partially cured resin impregnated tape or roving 79 is wound around the outer periphery of the ring 12. This partially cured resin may be in a tacky condition. The coil end turns 13 are laid in engagement with this tacky tape and the circular ring 12 preferably is made the same outer diameter as the diameter of the bottom of the slots 19. This establishes the inner peripheral surface of the coil ends 13 in engagement with this tacky tape.

When all of the coils 20 are in place, the coil end turns 13 will circumscribe the periphery of this circular ring 12. Next the coil ends 13 are secured to the ring 12. This preferred embodiment illustrates this securing means 14 as banding encircling the outer periphery of the coil ends 13 in the plane of the ring 12. This banding 14 may be resin impregnated tape or roving in a partially cured state, for example, a tacky condition. It is preferred to use a resin which cures under heat under approximately the same conditions as the resin used in the few turns of tape 79. Also, preferably this banding 14 is tape or roving of glass fibers for strength and insulating properties of an inorganic material. This banding 14 may exert considerable force, for example, 150 to 200 pounds of pull on the banding tape or roving and the U-shape cross section of the ring 12 provides a stiff ring to withstand this force. The high force is necessary to tightly pull the coil ends 13 down against the ring 12 to secure the two together. After completion of the banding 14, the assembly may be baked to cure the resin in the banding 14 and in the tape or roving 79.

Next the removable fixture 61 may be removed by turning the screws 76 to move the fingers 73 inwardly. Loosening the bolts 67 will permit removing the entire fixture 61 in an axial direction. Now the assembly may be balanced, for example, by dynamic balancing during rotation of the rotor 18. This will establish the circumferential position on the ring 12 requiring a balance weight. Such a balance weight 15 may be retained within the circular ring 12 by the converging inner walls of the flanges 26 and 27. The weight 15 may be made from molten lead or lead alloy by using removable dams 80 of an asbestos putty or like material. These dams are placed the required circumferential distance apart and then the molten lead weight 15 is poured in place to the required depth. The lead weight rapidly cools and solidifies and then the putty like dams 80 may be removed. It has been found that the weight 15 will fill and interlock with the interstices in the wire screen 58 and this prevents circumferential movement of the weight 15. This is most important during rapid starting and stopping and especially during rapid reversing of the dynamoelectric machine. The converging walls 28 and 29 prevent the weight 15 from moving in a radially inward direction and hence the ring 12 provides a means not only to support the coil ends 13 but also a means to quickly and positively locate the balance weights 15. The rotor 18 may then be dipped in varnish and finish baked or whatever is the usual and desired means of completing the manufacture of the rotor 18. In place of the metal wire screen, an open mesh glass fiber tape may be used. This will provide interstices in which the molten metal weight 15 will interlock. This especially may be used if a ring 12 which is 100 percent nonmetallic is desired.

The manufacture of the circular ring 12 provides an insulated outer face. This outer face is that which engages the coil ends 13 and in the preferred embodiment is practically entirely of insulating material so that no separate insulating means is required as is the case with metal coil shelves. The making of the circular ring 12 substantially and entirely from insulating material provides a lightweight and high strength ring. The resin treated tape or roving provides high strength in comparison to a molded insulator ring. The U-shape cross section of the ring 12 is used for strength in a radial direction with the collar 25 providing a wide shelf for support of the coil ends 13 and the radial depth of the flanges 26 and 27 providing the stiffness and strength.

The ring 12 provides a very convenient means to attach balance weights so that they are not easily dislodged. The support and balance ring assembly 11 is secured to the rotor 18 only by the securing means or banding 14. By this means the ring 12 essentially floats and can move slightly in an axial direction relative to the rotor end face 21 in accordance with the thermal gradients caused by changing operating conditions during operation of the motor. The coil heads or coil end turns 13 expand in an axial direction during heating and this floating condition of the ring 12 readily permits such expansion without placing a stress on the coil end supports, as was the case with coil shelves fastened to this rotor end face 21. The ring 12 has light weight and low inertia for its strength thus improving the motor performance. The ring 12 is fully bonded to the coil ends 13 during the curing of the tacky tape or roving 14 and 79. The present assembly 11 provides improved thermal stability between the coil head 13, banding 14, and coil support 12 due to use of identical or similar material in the banding 14 and ring 12. The thermal expansion characteristics are the same and this provides the thermal stabilizity.

The ring 12, being a floating ring not attached to the core 18 nor to the shaft 62, provides maximum ventilation for the coils 20. Air may pass radially outwardly between the coils 20 in the axial space between the rotor end face 21 and the ring 12. This was generally prevented or obstructed in the prior art construction utilizing coil shelves. Also all of the ventilation passageways 63 are unobstructed for maximum ventilation of the rotor 18. The ring 12 is substantially and entirely nonmetallic and therefore has no effect on the electrical or magnetic characteristics of the armature 18.

The present disclosure includes that contained in the appended claims, as well as that of the foregoing description. Although this invention has been described in its preferred form and preferred practice with a certain degree of particularity, it is understood that the present disclosure of the preferred form and preferred practice has been made only by way of example and that numerous changes in the details of construction and the combination and arrangement of parts and steps may be resorted to without departing from the spirit and the scope of the invention as hereinafter claimed.

I claim:

1. A coil end turn support and balancing ring assembly for the rotor winding of a dynamoelectric machine, comprising in combination:
   a ring substantially entirely of insulating material, and having an outer peripheral face;
   said ring being established radially inside the coil end turns of the windings of the rotor and in engagement with the inner surface of the coil end turns;
   means securing the coil end turns to said ring constituting the only support for said ring to permit the ring to move axially relative to the rotor upon expansion of the coil end turns due to heating during use;
   a generally cylindrical collar on said ring on which the outer peripheral face is located;
   flange means extending generally radially inwardly from said collar;
   an inner peripheral face on said collar;
   a roughened surface on said inner peripheral face; and
   a balance weight secured to said ring to dynamically balance said rotor and interlocking with said roughened surface to help secure the weight in circumferential position.

2. An assembly as set forth in claim 1, wherein said balance weight is secured to the flange means of the ring.

3. An assembly as set forth in claim 1, including first and second flanges in said flange means and wherein said weight is disposed between and in engagement with said first and second flanges.

4. An assembly as set forth in claim 1, wherein said securing means is a band of resin impregnated tape or roving circumscribing the coil end turns in the plane of said ring.

5. An assembly as set forth in claim 1 including:
   said means securing the coil end turns being the only support for said ring;
   said roughened surface including a metal screen on the inner peripheral face of said collar; and
   said weight being solidified from the molten state to lock into the interstices of the metal screen to secure the weight in circumferential and radial directions.